United States Patent
Gong et al.

(10) Patent No.: US 10,906,588 B2
(45) Date of Patent: *Feb. 2, 2021

(54) AIR SUPPLY SYSTEM FOR WHOLE VEHICLE

(71) Applicant: Guangdong Hua'chan Research Institute of Intelligent Transportation System Co., Ltd., Shenzhen (CN)

(72) Inventors: Shugang Gong, Guangdong (CN); Yulin Sun, Guangdong (CN); Weijing Zeng, Guangdong (CN); Yuanzhe Huang, Guangdong (CN); Changce Jin, Guangdong (CN)

(73) Assignee: GUANGDONG HUA'CHAN RESEARCH INSTITUTE OF INTELLIGENT TRANSPORTATION SYSTEM CO., LTD., Shenzhen (CN)

( * ) Notice: Subject to any disclaimer, the term of this patent is extended or adjusted under 35 U.S.C. 154(b) by 216 days.

This patent is subject to a terminal disclaimer.

(21) Appl. No.: 15/300,445

(22) PCT Filed: Apr. 1, 2014

(86) PCT No.: PCT/CN2014/074561
§ 371 (c)(1),
(2) Date: Sep. 29, 2016

(87) PCT Pub. No.: WO2015/149289
PCT Pub. Date: Oct. 8, 2015

(65) Prior Publication Data
US 2017/0120954 A1    May 4, 2017

(51) Int. Cl.
*B62D 21/17* (2006.01)
*B60H 1/00* (2006.01)
(Continued)

(52) U.S. Cl.
CPC ......... *B62D 21/17* (2013.01); *B60H 1/00007* (2013.01); *B60J 9/00* (2013.01);
(Continued)

(58) Field of Classification Search
CPC .................. F16F 9/43; B60H 1/00007; B60H 2001/00114; B60J 9/00; B60J 10/80;
(Continued)

(56) References Cited

U.S. PATENT DOCUMENTS 1,002,822 A * 9/1911 Cowles et al. ............ F16F 9/43
137/513.7
3,951,222 A * 4/1976 Fletcher .................... B60K 5/00
180/242

(Continued)

FOREIGN PATENT DOCUMENTS

CN    2572261 Y    9/2003
CN    2830952 Y    10/2006
(Continued)

OTHER PUBLICATIONS

International Search Report of PCT/CN2014/074561 dated Jan. 5, 2015.
(Continued)

*Primary Examiner* — Kevin F Murphy
*Assistant Examiner* — Jonathan J Waddy
(74) *Attorney, Agent, or Firm* — Robert L. Stearns; Dickinson Wright PLLC

(57) ABSTRACT

Disclosed is an air supply system for a whole vehicle, which is intended to solve the technical problem that it is hard to provide a multi-position and controllable air supply solution for an electric vehicle. A first air source device, a control valve and a pipeline constitute a first-type air supply system, the first-type air supply system has multiple air passages, each air passage is respectively provided with an air supply
(Continued)

port, and a controller can switch operating states of the control valve, control the opening or closing of the multiple air passages, and achieve controllable air supply effects in multiple positions. A second air source device and several pipelines constitute a second type of air supply system, the second type of air supply system has multiple air passages, each air passage is respectively provided with an air supply port, and a controller can switch operating states of the second air source device, control the opening or closing of the multiple air passages, and achieve controllable air supply effects. The first type of air supply system and the second type of air supply system are rationally configured on the electric vehicle, so as to achieve multi-position and controllable air supply effects.

9 Claims, 6 Drawing Sheets

(51) Int. Cl.

| | | |
|---|---|---|
| *B60J 10/80* | (2016.01) | |
| *B60J 9/00* | (2006.01) | |
| *B60K 11/06* | (2006.01) | |
| *B60R 16/08* | (2006.01) | |
| *B62D 15/00* | (2006.01) | |
| *B62D 21/16* | (2006.01) | |

(52) U.S. Cl.
CPC .............. *B60J 10/80* (2016.02); *B60K 11/06* (2013.01); *B60R 16/08* (2013.01); *B62D 15/00* (2013.01); *B62D 21/16* (2013.01); *B60H 2001/00114* (2013.01); *B60Y 2400/15* (2013.01); *Y10T 137/6855* (2015.04)

(58) Field of Classification Search
CPC ......... B60R 16/08; B60T 15/07; B60T 17/02; B60T 17/04; B60Y 2400/15; B62D 15/00; B62D 21/16; B62D 21/17; B60K 11/06; B60K 13/06; F15B 21/00; F15B 2211/205
USPC ............................... 701/45, 48, 49; 180/165
See application file for complete search history.

(56) References Cited

U.S. PATENT DOCUMENTS

| | | | | |
|---|---|---|---|---|
| 4,593,931 | A * | 6/1986 | Shiratori | B60G 17/04 180/41 |
| 4,640,331 | A * | 2/1987 | Braun | B60C 23/003 137/224 |
| 5,176,399 | A * | 1/1993 | Takehara | B60G 17/016 280/5.507 |
| 5,684,698 | A * | 11/1997 | Fujii | B60G 17/018 180/41 |
| 6,851,470 | B2 | 2/2005 | Laukhuf | |
| 7,055,832 | B2 * | 6/2006 | Germain | B60G 17/0162 280/124.106 |
| 8,973,688 | B2 * | 3/2015 | Steffen | B62D 55/065 180/9.52 |
| 10,266,199 | B2 * | 4/2019 | Gong | B62D 21/02 |
| 2003/0107191 | A1 * | 6/2003 | Romer | B60G 17/052 280/5.514 |
| 2006/0071466 | A1 * | 4/2006 | Rowe | B60G 11/30 280/782 |
| 2010/0270760 | A1 * | 10/2010 | Lloyd | B60G 11/27 280/5.514 |

FOREIGN PATENT DOCUMENTS

| | | |
|---|---|---|
| CN | 102353546 A | 2/2012 |
| CN | 202413815 U | 9/2012 |
| GB | 1254593 A | 11/1971 |
| JP | 11115473 A | 4/1999 |

OTHER PUBLICATIONS

Espacenet bibliographic data for CN Publication No. 102353546 published Feb. 15, 2012, 1 page.
Espacenet bibliographic data for CN Publication No. 202413815 published Sep. 5, 2012, 1 page.
Espacenet bibliographic data for CN Publication No. 2572261 published Sep. 10, 2003, 1 page.
Espacenet bibliographic data for CN Publication No. 2830952 published Oct. 25, 2006, 1 page.
Espacenet bibliographic data for JP Publication No. 11115473 published Apr. 27, 1999, 1 page.

* cited by examiner

AIR SUPPLY SYSTEM FOR WHOLE VEHICLE

TECHNICAL FIELD

The present application relates to the technical field of vehicle components, and more particularly, relates to an air supply system for a whole vehicle.

BACKGROUND

An electric vehicle in the prior art is usually provided with a mechanical transmission system, and the mechanical transmission efficiency based on the traditional vehicle technology has greatly reduced an electricity energy utilization efficiency. A hub motor technology is a driving technology that has a bright development prospect. The hub motor technology is called a wheel in-built motor technology of which a most remarkable characteristic is that a power device, a transmission device and a brake device are integrated into a wheel hub, such that a mechanical part of an electric vehicle can be greatly simplified. For this reason, an electric motor mounted on a pure electric vehicle has to face a problem about how to implement heat dissipation. In addition, in a traditional vehicle technology, an air supply system only provides air supply for a brake system; however, with a. continuous development of the vehicle technology, the vehicle is in growing needs of air supply, such as safety air cushions, air springs, sealing of cabin doors, and so on. In this regard, the air supply system has become an essential condition that auxiliary devices can normally operate. Particularly, the electric vehicles have more requirements of air supply to make sure that various auxiliary devices can operate normally. However, in the prior art, it is hard to provide a rational solution for providing air supply for a pure electric vehicle and achieve a multi-position and controllable air supply effect.

Technical Problem

A purpose of the present invention is to provide an air supply system for a whole vehicle, aiming at solving a problem in the prior art that it is hard to provide a multi-position and controllable air supply solution for an electric vehicle.

Technical Solution

The present invention is implemented like this: an air supply system for a whole vehicle mounted on an electric vehicle having a vehicle frame and configured for providing a plurality of air supply ports, wherein: the air supply system for the whole vehicle comprises a first air source device and a second air source device each having an air inlet and an air outlet, a control valve having an input port and a plurality of output ports and configured for switching an air flow direction, a controller configured for transmitting an electric signal to the control valve or the second air source device so as to switch a operating state, and a plurality of pipelines each having a start end and a tail end; the first air source device, the control valve and the pipelines constitute a first type of air supply system, the air outlet of the first air source device is connected with the input port of the control valve through one of the pipelines, start ends of the plurality of pipelines correspondingly connected with the plurality of output ports of the control valve one by one, and the tail ends of the plurality of pipelines form a plurality of air supply ports; the second air source device and the pipelines constitute a second type of air supply system, the start end of one pipeline is connected with the air outlet of the second air source device, and the tail end of the one pipeline constitutes one node, and the node is respectively connected with a plurality of pipelines in series, and the tail ends of the plurality of pipelines form the plurality of air supply ports respectively.

Further, the first type of air supply system is divided into a first air supply sub system mounted on a front part of the vehicle frame, a second air supply sub system mounted on a rear part of the vehicle frame and a third air supply sub system mounted on a middle part of the vehicle frame; the second type of air supply system is divided into a fourth air supply sub system mounted at the front part of the vehicle frame and a fifth air supply sub system mounted at the rear part of the vehicle frame; the first air supply sub system, the second air supply sub system, the third air supply sub system, the fourth air supply sub system and the fifth air supply sub system are all controlled by the controller.

Furthermore, the first air supply sub system comprises one first air source device, one control valve and a plurality of pipelines; the first air supply sub system is provided with four air supply ports, the output ports of the control valve are divided into a first output port, a second output port and a third output port, the first Output port of the control valve is communicated with two air supply ports, and the second output port and the third output port of the control valve are communicated with two other air supply ports respectively.

Furthermore, the second air supply sub system comprises two first air source devices, two control valves and a plurality of pipelines; the second air supply sub system has three air supply ports, the output port of each control valve is divided into a first output port and a second output port, the first output ports of the two control valves are communicated with two of the three air supply ports respectively, and the two second output ports of the two control valves are communicated with each other, and are communicated with the other one of the three air supply ports.

Furthermore, the third air supply sub system comprises two first air source devices, two control valves and a plurality of pipelines; the third air supply sub system is provided, with six air supply ports, the output ports of the control valve are divided into a first output port, a second output port and a third output port, the first output ends of the two control valves are communicated with two of the six air supply ports respectively, and the second output ports of the two control valves are communicated with another two of the six air supply ports respectively, and the third output ports of the two control valves are communicated through two first air ducts disposed therebetween, each of the first air ducts is respectively connected with one pipeline, and the tail ends of the two pipelines form the other two air supply ports of the six air supply ports.

Furthermore, a plurality of chambers extending along a profile of the vehicle frame are formed in an inner side of the vehicle frame, and one of the chambers is served as the first air duct.

Furthermore, the first air source device is a high pressure blower, and the control valve is a pneumatic reversing valve.

Furthermore, the fourth air supply sub system comprises one second air source device and a plurality of pipelines, the node is connected in series with a plurality of second air ducts, each of the plurality of air ducts is connected to one pipeline respectively, and the tail ends of the pipelines form the air supply ports; an inner side of the vehicle frame is provided with a plurality of chambers extending along a profile of the vehicle frame, and one of the chambers is served as the second air duct.

Furthermore, the fifth air supply sub system comprises one second air source device and a plurality of pipelines, the node is connected in series with a plurality of third air ducts, each of the third air ducts is connected to one pipeline respectively, and the tail ends of the pipelines form the air supply ports; an inner side of the vehicle frame is provided with a plurality of chambers that extend along a profile of the vehicle frame, and one of the chambers is served as the third air duct.

Furthermore, the second air source device is a high pressure air pump.

Advantageous Effects of the Present Invention

Compared with the prior art, the present invention has advantageous effects that: a first air source device, a control valve and a plurality of pipelines constitute a first type of air supply system, the first type of air supply system has a plurality of air passages, each of the air passages provides an air supply port respectively, each air supply port is arranged at a position of the electric vehicle where an air supply needs to be provided, and a controller can achieve a switching of operating states of the control valve and take control of opening or closing of a plurality of air passages, thereby achieving a multi-position and controllable air supply effect. The second air source device and a plurality of pipelines constitute a second type of air supply system, the second type of air supply system also has a plurality of air passages, and each of the air passages provides an air supply port respectively. Each air supply port is arranged at a position of the electric vehicle where an air supply needs to be provided. Moreover, the controller can achieve a switching of operating states of the second air source device and take control of opening or closing of the plurality of air passages, thereby achieving a controllable air supply effect. Specifically, positions of a pure electric vehicle where air supplies need to be provided comprise the positions of heat dissipation of electric motors, sealing of cabin doors, safety air cushions, air springs, and so on. By configuring the first type of air supply system and the second type of air supply system on the electric vehicle appropriately, the multi-position and controllable air supply effect can he achieved.

DETAILED DESCRIPTION OF THE PREFERRED EMBODIMENT

In order to make the purposes, technical solutions, and advantages of the present invention be clearer and more understandable, the present invention will be further described in detail hereinafter with reference to the accompanying drawings and embodiments. It should be understood that the embodiments described herein are only intended to illustrate but not to limit the present invention.

Figure 1:
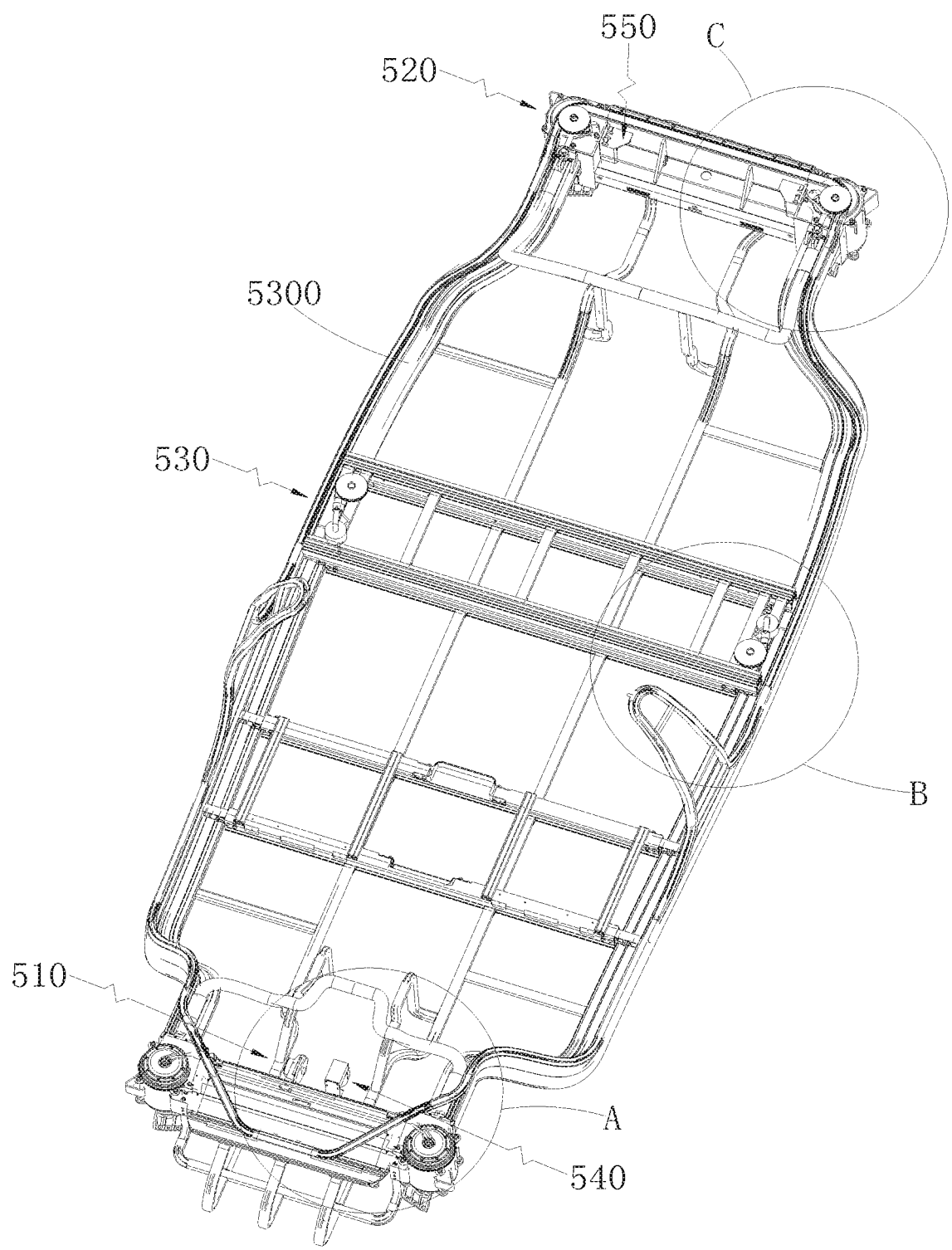
FIG. 1 illustrates a spatial diagram of an air supply system for a whole vehicle that is applied in a vehicle frame provided by an embodiment of the present invention.
Figure 2:
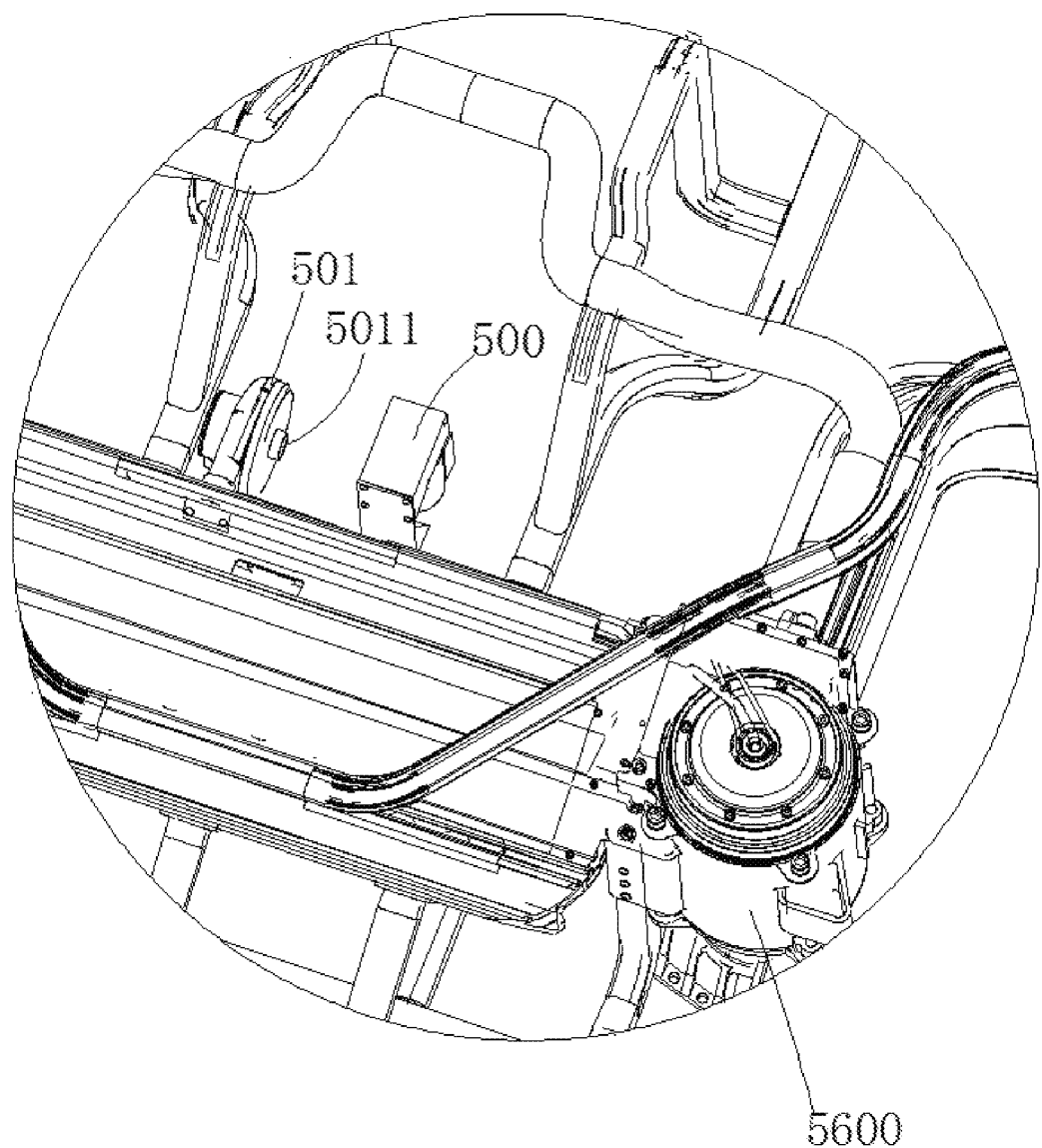
FIG. 2 illustrates an enlarged view of a part A in FIG. 1.
Figure 3:
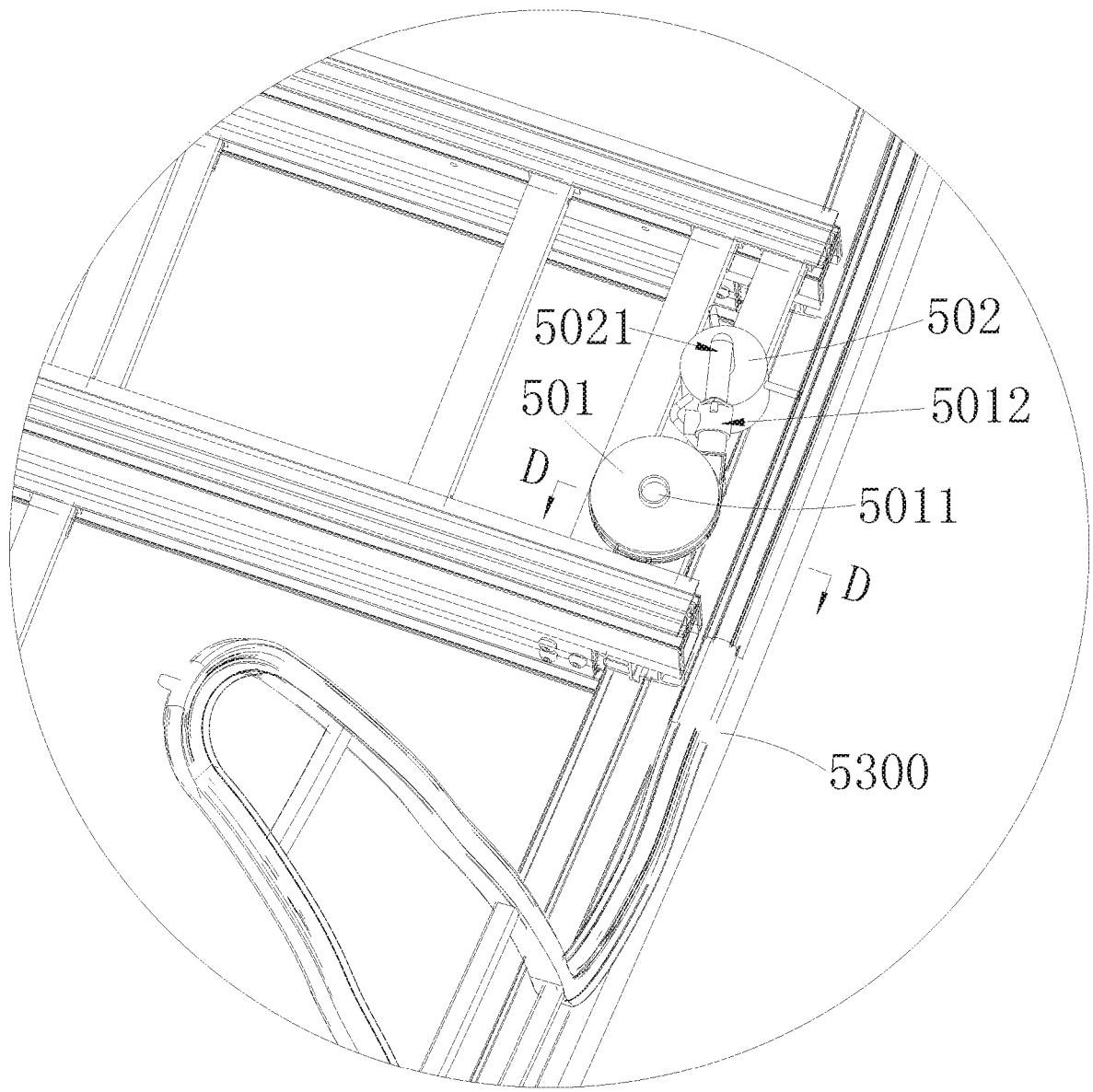
FIG. 3 illustrates an enlarged view of a part B in FIG. 1.
Figure 4:
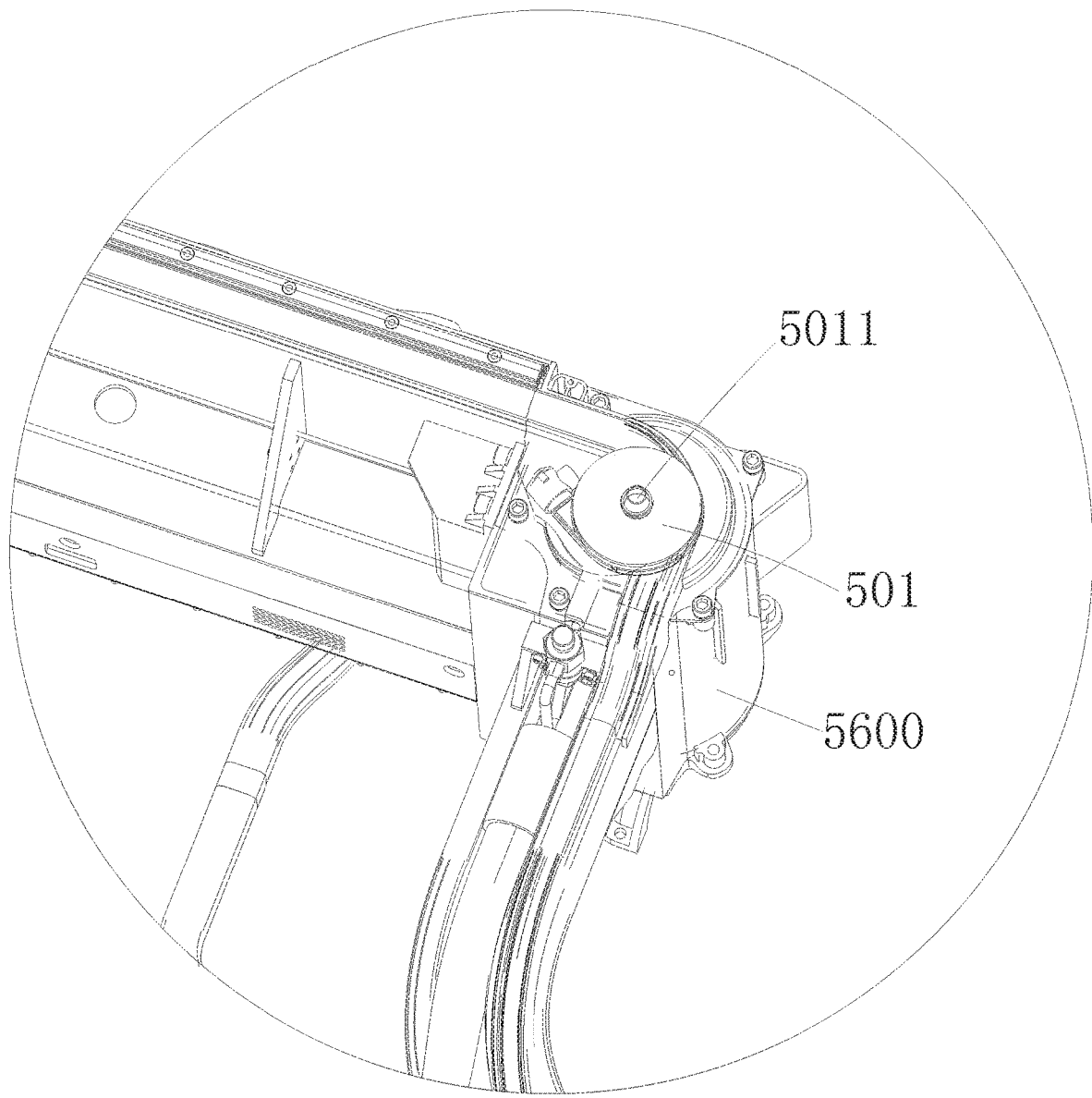
FIG. 4 illustrates an enlarged view of a part C in FIG. 1.
Figure 5:
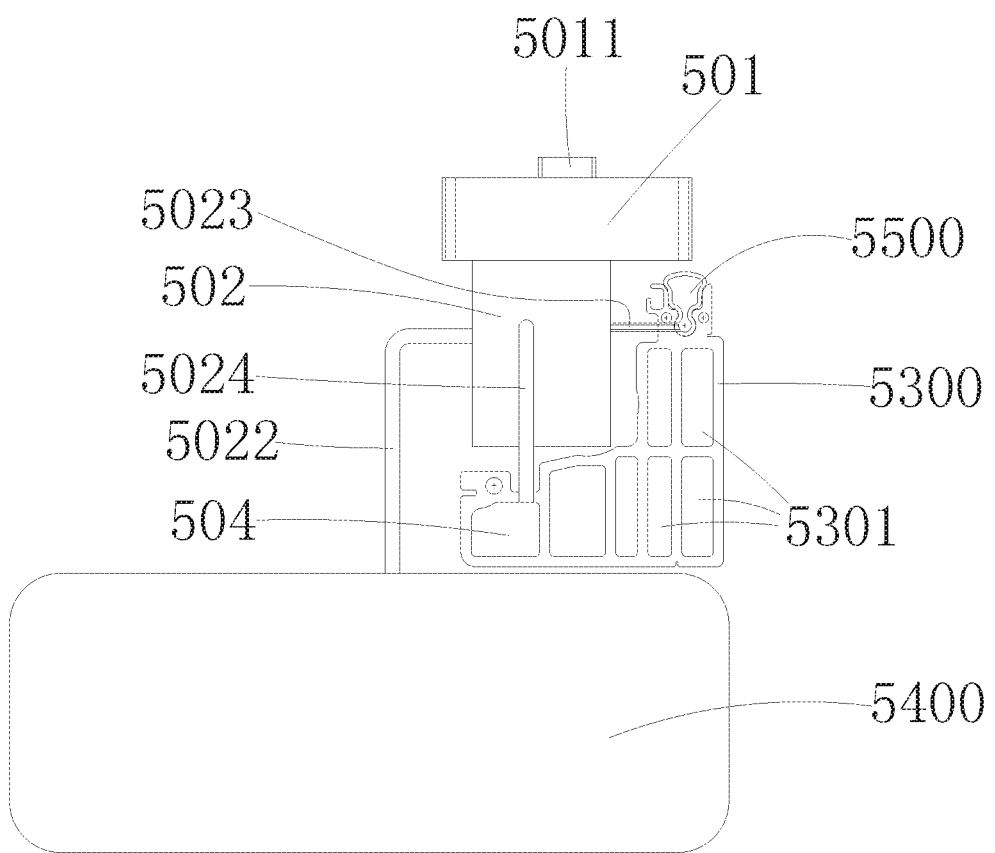
FIG. 5 illustrates a cross section view of FIG. 3 along D-D line.
Figure 6:
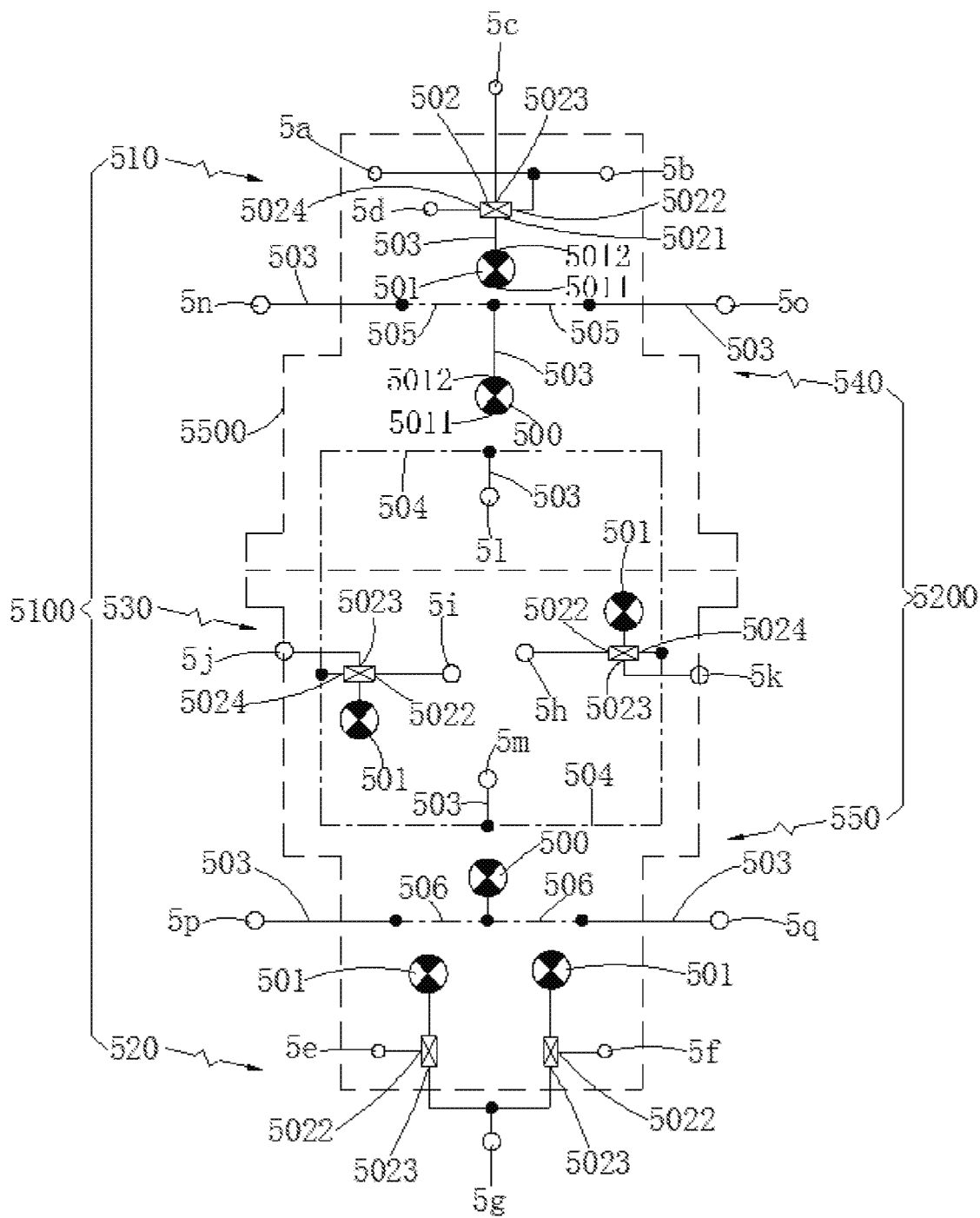
FIG. 6 illustrates a schematic view of the air supply system for the whole vehicle provided by the embodiment of the present invention.

As shown in FIG. 6, pipelines 503 are represented by solid lines, an airbag sealing strip 5500 is represented by broken lines, a first air duct 504, a second air duct 505, a third air duct 506 are represented by chain dotted lines, nodes are represented by filled circles, and air supply ports are represented by empty circles.

Referring to FIG. 1-6, an embodiment of the present invention provides an air supply system for a whole vehicle, mounted on an electric vehicle having a vehicle frame 5300 and configured for providing a plurality of air supply ports. The air supply system for the whole vehicle comprises a first air source device 501 and a second air source device 500 each having an air inlet 5011 and an air outlet 5012, a control valve 502 having an input port and a plurality of output ports (5022, 5023, 5024) and configured for switching an air flow direction, a controller (not shown in the figures) configured for transmitting an electric signal to the control valve 502 or the second air source device 500 so as to switch an operating state, and a plurality of pipelines 503 each having a start end and an tail end. The controller takes control of various electric equipments in the electric vehicle using a vehicle-mounted control computer system. The start end of each pipeline 503 is an inlet that allows a fluid to enter the pipeline 503, and the tail end of the pipeline 503 is an outlet that exhausts the fluid from the pipeline 503.

The first air source device 501, the control valve 502 and the pipelines 503 constitute a first type of air supply system 5100, the air outlet 5012 of the first air source device 501 and the input port 5021 of the control valve 502 are connected together though one pipeline 503. The start ends of the plurality of pipelines 503 are correspondingly connected with the plurality of output ports (5022, 5023, 5024) of the control valve 502 one by one, and the tail ends of the plurality of pipelines 503 form the plurality of air supply ports. in the first type of air supply system 5100, the controller is electrically connected to the control valve 502 and can switch the air flow direction that flows through the control valve 502 so as to achieve a control of opening or closing of various output ports of the respective control valve 502. When the first air source device 501 operates, the air enters from the air inlet 5011 of the first air source device 501 and is exhausted from the air outlet 5012 of the first air source device 5012 and then passes through the control valve 502. The control valve 502 works under the control of the electronic signal of the controller, the tail ends of the pipelines connected with the output ports of the control valve 502 form a plurality of air supply ports, and the venting of the plurality of air supply ports is controllable. The plurality of air supply ports provided by the first type of air supply system 5100 work independently.

The second air source device 500 and the pipelines 503 constitute the second type of air supply system 5200, a start end of one pipeline 503 is connected with the air outlet 5012 of the second air source device 500, and the tail end of the pipeline 503 forms a node, and the node is respectively connected in series with a plurality of pipelines 503. The node refers to a cross point formed by intersection of a plurality of pipelines or other components that can form a fluid passageway. In the second type of air supply system 5200, the controller is electrically connected with the second air source device 500, and can achieve a control of opening or closing of the second air source device 500. When the controller transmits an "opening" electric signal to the second air source device 500, and the second air source device 500 operates, air enters from the air inlet 5011 of the second air source device 500 and is vented out from the air outlet 5012 of the second air source device 500. The tail ends of the pipelines connected with the air outlet 5012 of the second air source device 500 form a plurality of air supply ports. Conversely, when the controller transmits a "closing" electric signal to the second air source device 500, the second air source device 500 doesn't operate, and the tail ends of the pipelines will not provide air. The plurality of air supply ports provided by the second type of air supply system 5200 work simultaneously.

The first type of air supply system 5100 and the second type of air supply system 5200 are configured appropriately on the electric vehicle and are controlled by a single controller, which is regarded as a proposal with optimal configuration which can not only meet the requirement of multi-position and controllable air supply, but also achieve an effect of small space occupation and low power consumption.

The first air source device 501, the control valve 502 and the plurality of pipelines 503 constitute the first type of air supply system 5100, the first type of air supply system 5100 has a plurality of air passages, each of the air passages provides an air supply port respectively, and the air inlet is arranged at a position of the electric vehicle where an air supply needs to be provided. The controller can achieve a switching of operating states of the control valve 502, and take control of opening or closing of a plurality of air passages, thereby achieving a multi-position and controllable air supply effect. The second air source device 500 and a plurality of pipelines 503 constitute the second type of air supply system 5200. The second type of air supply system 5200 also has a plurality of air passages, and each of the air passages provides an air supply port respectively. The air supply port is arranged at a position of the electric vehicle where an air supply needs to be provided; moreover, the controller can achieve a switching of operating states of the second air source device 500, and take control of opening or closing of the plurality of air passages, thereby achieving a controllable air supply effect. Specifically, positions of a pure electric vehicle where air supplies are provided comprise positions of heat dissipation of electric motors, sealing of cabin doors, safety air cushions, air springs, and so on. The first type of air supply system 5100 and the second type of air supply system 5200 are arranged appropriately on the electric vehicle, such that the multi-position and controllable air supply effect can be achieved.

Further, the first type of air supply system 5100 is divided into a first air supply sub system 510 mounted on a front part of the vehicle frame 5300, a second air supply sub system 520 mounted on a rear part of the vehicle frame 5300 and a third air supply sub system 530 mounted on a middle part of the vehicle frame 5300; the second type of air supply system 5200 is divided into a fourth air supply sub system 510 mounted on the front part of the vehicle frame 5300 and a fifth air supply sub system 550 mounted on the rear part of the vehicle frame 5300. The first air supply sub system 510, the second air supply sub system 520, the third air supply sub system 530, the fourth air supply sub system 540 and the fifth air supply sub system 550 are all controlled by the controller. The first air supply sub system 510 is configured for air supply and heat dissipation of hub motors and steering motors arranged on two sides of the front part of the electric vehicle, air supply of a collision air cushion of a battery at the front part, and air supply of a canopy, the second air supply sub system 520 is configured for air supply and heat dissipation of hub motors and steering motors arranged on two sides of the rear part of the electric vehicle, air supply of a collision air cushion of a battery at the rear part; the third air supply sub system 530 is configured for sealing and providing air supply for a front cabin door and a back cabin door, aspirating of power battery plug connectors and air supply of the air cushion. The fourth air supply sub system 540 and the fifth air supply sub system 550 are configured for air supply of air springs on the front cabin door and the back cabin door of the electric vehicle. These air supply sub systems are all controlled by a single controller, in this way, the air supply system for the whole vehicle can be much better in manipulation and practicability, and various air supply requirements from a user of an electric vehicle can be satisfied. These air supply sub systems are arranged at different positions of the vehicle frame 5300, thereby complying with a principle of proximity and reducing a space occupation.

Furthermore, the first air supply sub system 510 comprises one first air source device 501, one control valve 502 and a plurality of pipelines 503. The first air supply sub system 510 has four air supply ports (5a, 5b, 5c, 5d), the output ports of the control valve 502 are divided into a first output port 5022, a second output port 5023 and a third output port 5024, the first output port 5022 of the control valve 502 is communicated with two air supply ports 5a and 5b (which are configured for air supply and heat dissipation of the hub motors and steering motors arranged at two sides of the front part of the electric vehicle) in the four air supply ports, air exhausted from the first output port 5022 of the control valve 502 flows towards a node along a pipeline 503, and further flows towards corresponding air supply port 5a and 5b along two pipelines 503 from the node. An axial direction of each of the air supply ports 5a and 5b is perpendicular to a flat surface of the vehicle frame 5300, that is, the axial direction of each of the air supply ports 5a and 5b is parallel with an axial direction of each of the steering motors 5600, which allows air vented from the air supply ports 5a and 5b to flow into the hub motors and the steering motors 5600, thereby finishing heat dissipation of the hub motors and the steering motors 5600 at two sides of the front part of the electric vehicle; moreover, the second output port 5023 and the third output port 5024 of the control valve 502 are communicated with the other two air supply ports 5c and 5d (configured for providing air supply for the collision air cushion of the battery at the front part, and a canopy) of the four air supply ports, the second output port 5023 is connected with the start end of a pipeline and the tail end of the pipeline forms the air supply port 5c, the third output port 5024 is connected with the start end of another pipeline and the tail end of the pipeline forms the air supply port 5d.

Furthermore, the second air supply sub system 520 comprises one first air source device 501, two control valves 502 and a plurality of pipelines 503, the second air supply sub system 520 has three air support ports (5e, 5f, 5g), the output ports of the control valve 502 are divided into a first output port 5022 and a second output port 5023, two first output ports 5022 of the two control valves 502 are communicated with the two air supply ports 5e and 5f (configured for air supply and heat dissipation of hub motors and steering motors arranged at two sides of the rear part of the electric vehicle) in the three air supply ports respectively, air vented out from the first output port 5022 of the control valve 502 flows towards the air support port 5e and 5f along the pipelines 503. The axial direction of the air supply ports 5e and 5f are perpendicular to the flat surface of the vehicle frame 5300, that is, the axial direction of the air supply ports 5e and 5f are parallel to the axial direction of the steering motors, which allows the air vented from the air supply ports 5e and 5f to flow into the hub motors and the steering motors, thereby finishing the heat dissipation of the hub motors and the steering motors arranged at two sides of the rear part of the electric vehicle. The output ports 5023 of the two control valves 502 are communicated with each other and are further communicated with the other air supply port 5g (configured for providing air supply for the collision air cushion of the battery at the rear of the electric vehicle) of the three air supply ports, and the air vented from the output ports 5023 of the two control valves 502 flows toward a node together along one pipeline 503 respectively, and further flow toward the air supply port 5g along another pipeline from the node. This configuration can effectively ensure a normal operation of the air supply port 5g configured for providing air supply for the collision air cushion of the battery at the rear part of the electric vehicle; once a first air source device 501 operates, the air supply for the collision air cushion of the battery at the rear part of the electric vehicle can be finished.

Furthermore, the third air supply sub system 530 comprises two first air source devices 501, two control valves 502 and a plurality of pipelines 503. The third air supply sub system 530 has six air supply ports (5h, 5i, 5j, 5k, 5l, 5m), and the output ports of the control valve 502 are divided into a first output port 5022, a second output port 5023 and a third output port 5024, the first output ports 5022 of the two control valves 502 are communicated with the two air supply ports 5h and 5i (configured for providing an air cushion 5400 with air supply) of the six air supply ports respectively; moreover, the output ports 5023 of the two control valves 502 are communicated with another two air supply ports 5j and 5k (configured for providing the front cabin door and the rear cabin door of the electric vehicle with sealing and air supply) of the six air supply ports, the air supply ports 5j and 5k inflate a chamber of an air bag sealing strip 5500 so as to implement sealing of the front cabin door and the rear cabin door; moreover, the third output ports of the two control valves 502 are communicated via two first air ducts 504 therebetween, each of the air ducts 504 is connected with one pipeline 503, and the tail ends of the pipelines 503 are served as the other two air supply ports 5l and 5m (configured for aspirating of an plug connector of a power battery) of the six air supply ports.

Furthermore, a plurality of chambers that extend along a profile of the vehicle frame 5300 are formed in an inner side of the vehicle frame 5300, and one of the chambers 5301 is served as the first air duct 504. The chambers 5301 arranged in the vehicle frame 5300 have different functionalities, such as, receiving electric cables, working as air passages having different functions, allowing brake oil to flow, and so on. This structure can make use of the space of the electric vehicle effectively and achieve an air duct effect without adding pipelines additionally. Specifically, the chambers 5301 extend along the profile of the vehicle frame 5300, the profile of the vehicle frame 5300 is loop-shaped, the first air duct 504 is also loop-shaped. A cross section of each of the chambers 5301 is substantially rectangle-shaped, so that it is convenient for the vehicle frame 5300 to be processed and molded.

Furthermore, the first air source device 501 is a high pressure blower, the control valve 502 is a pneumatic reversing valve. The high pressure blower is a mechanical device configured for increasing air pressure via input mechanical energy and exhausted gas, the pneumatic reversing valve plays the role of receiving an electric signal from the controller so as to switch an air flow direction. Applying a combination of the high pressure blower and the pneumatic reversing valve can meet the requirement of independent and multi-position air supply. The axial directions of the high pressure blowers in the second air supply sub system 520 and the third air supply sub system 530 are perpendicular to the flat surface of the vehicle frame 5300, which enables the high pressure blower to be mounted in the electric vehicle in a smaller room and in a vertical direction. The high pressure blowers and the pneumatic reversing valves are divided into two groups and are arranged at two sides of the middle portion of the electric vehicle respectively.

Furthermore, the fourth air supply sub system 540 comprises one second air supply device 500 and a plurality of pipelines 503. The node is connected in series with a plurality of second air ducts 505, each of the second air ducts 505 is connected with one pipeline 503 respectively, and the tail ends of the pipeline 503 are served as the air supply ports 5n and 5o (configured for providing air supplies for air springs of the front cabin door and the rear cabin door of the electric vehicle). A plurality of chambers 5301 extending along the profile of the vehicle frame 5300 are formed in the inner side of the vehicle frame 5300, and one of the chambers 5301 is served as the second air duct 505. The fourth air supply sub system 540 is controlled by the controller and is configured for providing air supplies for the lifting of the air springs of the front cabin door and the rear cabin door, and can adjust a speed of the lifting and take control of opening and closing of the front cabin door of the electric vehicle by cooperating with a hinge mechanism. The air springs are free style air springs which are mainly configured for support and have a shortest position and a longest position merely, and can't stop on their own in a moving process. In this embodiment, the node is connected in series with two second air ducts 505, each of the two second air ducts 505 is connected to one pipeline 503 respectively, and the tail ends of the pipelines 503 are served as two air supply ports 5n and 5o configured for inflating or aspirating the two air springs of the front cabin door of the electric vehicle simultaneously, thereby achieving the control of opening and closing of the front cabin door.

Furthermore, the fifth air supply sub system 550 comprises one second air source device 500 and the plurality of pipelines 503. The node is connected in series with a plurality of third air ducts 506, each of the air ducts 506 is connected with a pipeline 503 respectively, and the tail ends of the pipelines 503 are served as the air supply ports 5p and 5q (configured for providing air supplies for the air springs of the rear cabin door of the electric vehicle). A plurality of chambers 5301 extending along the profile of the vehicle frame 5300 are formed in an inner side of the vehicle frame 5300 forms, and one of the chambers 5301 is served as the third air duct 506. The fifth air supply sub system 550, which is controlled by the controller and is configured for providing air supplies for the lifting of the air springs of the rear cabin door, can adjust a speed of lifting and take control of opening and closing of the rear cabin door of the electric vehicle by cooperating with a hinge mechanism. In this embodiment, the node is connected in series with two third air ducts 506, each of the two third air ducts 506 is connected to one pipeline 503 respectively, and the tail ends of the pipeline 503 form two air supply ports 5p and 5q configured for inflating or aspirating the two air springs of the front cabin door of the electric vehicle simultaneously, thereby achieving the control of opening and closing of the rear cabin door. The fourth air supply sub system 540 and the fifth air supply sub system 550 can work synchronously or asynchronously, thereby achieving different open modes of the cabin doors of the electric vehicle.

Furthermore, the second air source device 500 is a high pressure air pump which can exhaust gas from an enclosed space or inhaling gas into the enclosed space, in other words, inflating and aspirating. The high pressure air pump is controlled by the controller and is configured to take control of inflating and aspirating of the air springs, thereby achieving a control of opening and closing of the front cabin door and the rear cabin door of the electric vehicle. By applying the high pressure air pump, the requirement of simultaneous air supply for a plurality of air support ports can be met.

The aforementioned embodiments are only preferred embodiments of the present invention, and should not be regarded as being any limitation to the present invention. Any modification, equivalent replacement, improvement, and so on, which are made within the spirit and the principle of the present invention, should be included within the protection scope of the present invention.

What is claimed is:

1. An air supply system for a whole vehicle, which is mounted on an electric vehicle having a vehicle frame;
   wherein the air supply system comprises a first type of air supply system and a second type of air supply system, the first type of air supply system includes a plurality of first air source devices, a plurality of first control valves each having an input port and a plurality of output ports and configured to switch an air flow direction, and a first set of pipelines;
   the second type of air supply system includes a plurality of second air source devices, a plurality of second control valves and a second set of pipelines each having a start end and a tail end;
   the air supply system further includes a controller configured to transmit an electric signal to the first/second control valves or the second air source devices so as to switch an operating state;
   wherein the first type of air supply system is divided into a first air supply sub system mounted on a front part of the vehicle frame, a second air supply sub system mounted on a rear part of the vehicle frame and a third air supply sub system mounted on a middle part of the vehicle frame; the second type of air supply system is divided into a fourth air supply sub system mounted at the front part of the vehicle frame and a fifth air supply sub system mounted at the rear part of the vehicle frame; and the first air supply sub system, the second air supply sub system, the third air supply sub system, the fourth air supply sub system and the fifth air supply sub system are all controlled by the controller;
   wherein the first air supply sub system or the third air supply sub system at least comprises an air outlet of one first air source device connected with an input port of one first control valve through one pipeline in the first set of pipelines, start ends of additional pipelines in the first set of pipelines are correspondingly connected with a plurality of output ports of the one first control valve one by one, and tail ends of the additional pipelines in the first set of pipelines form a plurality of first air supply ports;
   wherein the fourth air supply sub system or the fifth air supply sub system at least comprises a start end of one pipeline in the second set of pipelines is connected with an air outlet of one second air source device, a tail end of the one pipeline in the second set of pipelines constitutes one node, the node is respectively connected with additional pipelines in the second set of pipelines, and tail ends of the additional pipelines in the second set of pipelines form a plurality of second air supply ports respectively; and
   wherein the third air supply sub system includes two first air source devices, two first control valves and a plurality of pipelines in the first set of pipelines; the third air supply sub system is provided with six first air supply ports, each of the two first control valves of the third air supply sub system has a first output port, a second output port and a third output port, the first output ports of the two first control valves of the third air supply sub system are communicated with two of the six first air supply ports respectively via pipelines of the third air supply sub system, the second output ports of the two first control valves of the third air supply sub system are communicated with another two of the six first air supply ports respectively via pipelines of the third air supply sub system, and the third output ports of the two first control valves of the third air supply sub system are communicated through two first air ducts disposed therebetween, the two first air ducts are respectively connected to two pipelines in the first set of pipelines of the third air supply sub system, and tail ends of the two pipelines of the third air supply sub system connected to the two first air ducts form the last two first air supply ports of the six first air supply ports.

2. The air supply system for the whole vehicle according to claim 1, wherein the first air supply sub system comprises one first air source device, one first control valve and a plurality of pipelines in the first set of pipelines; the first air supply sub system is provided with four first air supply ports, output ports of the first control valve of the first air supply sub system are divided into a first output port, a second output port and a third output port, wherein the first output port of the first control valve of the first air supply sub system is communicated with two first air supply ports of the four first air supply ports via pipelines of the first air supply sub system, and the second output port and the third output port of the first control valve of the first air supply sub system are communicated with two other first air supply ports of the four first air supply ports, respectively via pipelines of the first air supply sub system.

3. The air supply system for the whole vehicle according to claim 1, wherein the second air supply sub system comprises two first air source devices, two first control valves and a plurality of pipelines in the first set of pipelines; the second air supply sub system has three first air supply ports, each of the two first control valve of the second air supply sub system has a first output port and a second output port, the two first output ports of the two first control valves of the second air supply sub system are communicated with two of the three first air supply ports respectively via pipelines of the second air supply sub system, and the two second output ports of the two first control valves of the second air supply sub system are interconnected and are further communicated with the last one of the three first air supply ports via pipelines of the second air supply sub system.

4. The air supply system for the whole vehicle according to claim 1, wherein a plurality of chambers extending along a profile of the vehicle frame are formed in an inner side of the vehicle frame, and one of the chambers forms the first air duct.

5. The air supply system for the whole vehicle according to claim 1, wherein the first air source devices are high pressure blowers, and the first control valves of the first type of air supply system are pneumatic reversing valves.

6. The air supply system for the whole vehicle according to claim 1, wherein the fourth air supply sub system comprises one second air source device and a plurality of pipelines in the second set of pipelines, the node is connected in series with a plurality of second air ducts, each of the plurality of second air ducts is connected to one of the pipelines in the second set of pipelines of the fourth air supply sub system respectively, and the tail ends of the pipelines in the second set of pipelines of the fourth air supply sub system form the second air supply ports; an inner side of the vehicle frame is provided with a plurality of chambers extending along a profile of the vehicle frame, and one of the chambers forms the second air duct.

7. The air supply system for the whole vehicle according to claim 6, wherein a second air source device of the fourth air supply sub system is a high pressure air pump.

8. The air supply system for the whole vehicle according to claim 1, wherein the fifth air supply sub system comprises one second air source device and a plurality of pipelines in the second set of pipelines, the node is connected in series with a plurality of third air ducts, each of the third air ducts is connected to one of the pipelines in the second set of pipelines of the fifth air supply sub system respectively, and the tail ends of the pipelines in the second set of pipelines of the fifth air supply sub system form the second air supply ports; an inner side of the vehicle frame is provided with a plurality of chambers that extend along a profile of the vehicle frame, and one of the chamber forms the third air duct.

9. The air supply system for the whole vehicle according to claim 8, wherein a second air source device of the fifth air supply sub system is a high pressure air pump.

* * * * *